(12) United States Patent
Gerlinger et al.

(10) Patent No.: US 11,747,240 B2
(45) Date of Patent: *Sep. 5, 2023

(54) METHOD AND SYSTEM FOR PREPARING A SOLUTION

(71) Applicant: Endress+Hauser Conducta GmbH+Co. KG, Gerlingen (DE)

(72) Inventors: Anja Gerlinger, Stuttgart (DE); Ulrich Kathe, Ludwigsburg (DE); Daniel Schweitzer, Remshalden (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 790 days.

This patent is subject to a terminal disclaimer.

(21) Appl. No.: 16/722,644

(22) Filed: Dec. 20, 2019

(65) Prior Publication Data

US 2020/0200654 A1    Jun. 25, 2020

(30) Foreign Application Priority Data

Dec. 20, 2018 (DE) ............. 10 2018 133 148.7
Nov. 8, 2019 (DE) ............. 10 2019 130 235.8
Nov. 8, 2019 (DE) ............. 10 2019 130 236.6

(51) Int. Cl.
*G01N 1/28* (2006.01)

(52) U.S. Cl.
CPC ....... *G01N 1/28* (2013.01); *G01N 2001/2893* (2013.01)

(58) Field of Classification Search
None
See application file for complete search history.

(56) References Cited

U.S. PATENT DOCUMENTS

2009/0277242 A1* 11/2009 Crane ............. A61B 5/1459
                                                  73/1.02
2012/0027650 A1    2/2012 Goodman et al.

FOREIGN PATENT DOCUMENTS

| CA | 2520015 A1 | 9/2004 |
| CN | 101687586 A | 3/2010 |
| CN | 104769127 A | 7/2015 |
| CN | 207312274 U | 5/2018 |
| DE | 19850934 A1 | 5/2000 |
| DE | 102009001861 A1 | 9/2010 |
| DE | 102011007011 A1 | 10/2012 |
| DE | 102011075762 A1 | 11/2012 |
| DE | 102013114011 A1 | 6/2015 |
| DE | 102013114138 A1 | 6/2015 |
| EP | 2041562 B1 | 5/2019 |
| WO | 2008141243 A2 | 11/2008 |

* cited by examiner

*Primary Examiner* — Xiaoyun R Xu
(74) *Attorney, Agent, or Firm* — Kelly J. Smith; Endress+Hauser (USA) Holding, Inc.

(57) ABSTRACT

The present disclosure relates to a capsule for preparing a solution for use with a measuring device for determining a measurand that depends on a concentration of at least one analyte in a sample. The capsule includes a wall completely enclosing an interior, at least one substance accommodated within the interior, and at least one stirring body. The present disclosure also relates to a system, which includes at least one capsule and a liquid container closed in a liquid-tight manner, which contains a predetermined volume of a liquid containing a solvent. In addition, the wall of the capsule is formed from a material which dissolves at least partially in the solvent.

20 Claims, 3 Drawing Sheets

METHOD AND SYSTEM FOR PREPARING A SOLUTION

CROSS-REFERENCE TO RELATED APPLICATIONS

The present application is related to and claims the priority benefit of German Patent Application Nos. 10 2018 133 148.7, filed on Dec. 20, 2018, 10 2019 130 236.6, filed on Nov. 8, 2019 and 10 2019 130 235.8, filed Nov. 8, 2019, the entire contents of which are incorporated herein by reference.

TECHNICAL FIELD

The present disclosure relates to a method and a system for preparing a solution for use with a measuring device which serves to determine a measurand that depends on a concentration of at least one analyte in a sample. The present disclosure also relates to a method for calibrating, verifying or adjusting such a measuring device.

SUMMARY

The object of analytical measuring technology in the laboratory and in the field of process measuring technology is the qualitative or quantitative determination of ingredients in measuring media, e.g. in measuring liquids. A wide range of measuring devices for measuring a multiplicity of different parameters are used for this purpose. In the field of liquid analysis, potentiometric sensors, such as pH measuring chains or ion-selective electrodes, amperometric sensors, conductivity sensors, optochemical sensors, photometers, spectrometers and analyzers are used, for example. Some measuring devices quantitatively determine a concentration of a single substance, for example an ion concentration, the pH value, the concentration of a dissolved gas, or the concentration of specific chemical compounds. Other measuring devices serve to determine sum parameters which include the concentration of a plurality of different substances, e.g. total organic carbon (TOC), total oxygen demand (CSB or COD), total nitrogen (TN), total phosphorus (TP), conductivity, or the spectral absorption coefficient (SAC).

In measuring mode, some measuring devices for liquid analysis require solutions which are used for measuring the measurand in samples of unknown composition and/or for calibrating, verifying or adjusting the measuring device.

One example of such solutions are reagent solutions which serve to carry out a chemical reaction with the analyte in a sample before a measured value is detected. Such reagent solutions are used, for example, in automatic analyzers. Analyzers are used, for example, for measuring the concentration of an analyte or a sum parameter determined by a plurality of analytes. Analyzers are often designed to add one or more reagent solutions to a sample. The substances contained in the reagent solutions undergo a chemical reaction with the analyte or analytes, the reaction product of which can be detected by means of a measuring method. Frequently, the analyzer is configured to detect the reaction product optically, for example photometrically or spectrometrically, and to generate a measurement signal that correlates with the quantity of reaction product produced. This measurement signal can be used to determine the concentration of the analyte or the value of the sum parameter in the original sample. Such analyzers are known, for example, from DE 10 2013 114138 A1, DE 10 2013 114011 A1, DE 10 2011 075762 A1 or DE 10 2011 007011 A1.

So-called standard solutions are usually used for calibrating, verifying and adjusting the measuring devices, including the analyzers, mentioned here. "Calibrating a measuring device" is understood to mean ascertaining a deviation of the measured value measured by the measuring device from a value of the measurand that is assumed to be correct. This value that is assumed to be correct can be made available by a second measuring device which serves as standard. In addition to ascertaining the deviation, the verification also includes determining the deviation and evaluating it. "Adjusting" means adapting the measuring device in such a way that a measuring circuit and/or a model, by means of which the measuring device determines a measured value in the physical unit of the measurand from a primary measurement signal, for example a measuring voltage or a measuring current, is adapted such that the measured value determined corresponds to the value of the measurand that is assumed to be correct. Standard solutions used for the calibration of measuring devices for analytical measurement technology contain a predetermined or known quantity, for example a predetermined concentration, of one or a plurality of analytes to be determined by the measuring device to be calibrated. This predetermined analyte content of the standard solutions is used as a comparative value (measured value that is assumed to be correct) for the calibration, verification or adjustment of the measuring devices.

The composition of the liquids used by measuring devices of analytical engineering must be adjusted as precisely as possible in order to ensure correct results. This applies in a particularly high degree to the standard solutions used for calibration, verification and/or adjustment since a deviation of the actual concentration of the analyte or analytes in the standard solution from the desired concentration has a direct effect on the measuring accuracy of the measuring device.

High demands are therefore placed on the degree of purity of the starting materials used for the liquids. It is also necessary to work carefully and precisely in the preparation of the standard solutions. This requires suitable laboratory equipment, high training levels of the personnel entrusted with the preparation of the solutions, and elaborate quality control. Depending on which ingredients are to be added to the solution, corresponding occupational safety measures must be observed. It is therefore customary to prepare reagent solutions, standard solutions and other consumable liquids of measuring devices in a specialized central laboratory and to send them ready-for-use to the users of the measuring devices. Measuring device manufacturers frequently also prepare reagent solutions and standard solutions for the calibration, adjustment and verification of their measuring devices and offer them as accessories or operating supplies for the corresponding measuring devices. However, some of these solutions are only temporarily stable, i.e., do not have a stable concentration, for example when they contain constituents which degenerate or are chemically converted under the influence of temperature, light or oxygen or by bacterial decomposition. Such standard solutions must frequently be renewed and possibly cannot be centrally manufactured and sent to the user in a ready-to-use form. Standard solutions for verification or calibration measurements for turbidity meters may include particulate matter that settle and/or coagulate after a certain period of time. Such solutions are likewise only temporarily stable.

It is therefore desirable to prepare standard solutions immediately before their use for calibrating, verifying or adjusting a measuring device, possibly on site. Since in this case the user of the measuring device must as a rule prepare the standard solution himself, a method which is as simple, reliable and robust as possible should be available for the preparation of the standard solution. A few approaches in this respect are known in the prior art.

For example, the analyte and optionally further constituents of a standard solution, for example buffers or stabilizers, can be provided to the user in the form of a highly concentrated stock solution in a glass or plastic ampoule or bottle. The ampoule content must be transferred by the user to a volumetric flask, and a defined volume of a solvent, for example ultrapure water, must then be added. The advantage of this method is that the analyte is already present in the ampoule in the required quality and quantity. The user does not have to be concerned with the purity of the substances used, and measuring, for example weighing, the substances of the stock solution used from the ampoule is dispensed with. Nevertheless, there is a risk that the standard solution thus prepared does not contain the analyte at the required concentration since errors in measuring the solvent volume are possible. It can also happen that the ampoule content is not completely transferred into the volumetric flask if, for example, drops remain on the ampoule wall during the transfer. The correct handling of the ampoules requires trained personnel and corresponding quality control. Moreover, degeneration of the ampoule content by photochemically or thermally induced degradation processes cannot be completely ruled out in this method.

Reagent solutions comprising various substances which possibly react with one another under the influence of light and heat and thus have a limited shelf life, can be divided into a plurality of solid or liquid components which, when uncombined, have a long shelf life. This is known, for example, from DE 10 2011 007 011 A1, which describes an analyzer that is configured to automatically prepare a reagent solution from a plurality of components shortly before its use in the measuring device. To this end, the analyzer has a first reservoir with a first reagent component, a second reservoir with a second reagent component, and a mixing device for mixing a predetermined quantity of the first reagent component from the first reservoir with a predetermined quantity of the second reagent component from the second reservoir in order to form a predetermined quantity of the reagent solution. The reagent solution to be prepared, which itself does not have a long shelf life because its ingredients undergo degradation reactions, which may be thermally or photochemically induced, in solution, is thus divided for the purpose of storage into two reagent components, which in turn can comprise one or more individual chemical substances that, in the combination present in the respective reagent components, do not undergo any chemical decomposition reactions, or undergo chemical decomposition reactions taking place only very slowly under the conditions prevailing in the reservoirs.

According to the same principle, several ampoules, bottles or bags respectively containing individual components of the solution to be prepared can be made available to a user for the preparation of reagent or standard solutions. Although this procedure prevents premature degeneration of the solutions, it also has the same disadvantages as the method described above, in which a single stock solution has to be diluted with solvent by the user.

The object of the present disclosure is therefore to specify improved means and an improved method for preparing a solution for use with a measuring device for determining a measurand that depends on a concentration of at least one analyte in a sample. The method should be able to be carried out with little effort by untrained or only slightly trained personnel and have a low risk of error.

This object is achieved by the capsule of the present disclosure, along with the corresponding system and method. The present disclosure also relates to a method for calibrating, verifying and/or adjusting a measuring device for determining a measurand that depends on a concentration of at least one analyte in a sample.

The method according to the present disclosure for preparing a solution for use with a measuring device for determining a measurand that depends on a concentration of at least one analyte in a sample includes a wall completely enclosing an interior, at least one substance accommodated within the interior, and at least one stirring body.

The substance is protected from contamination, oxygen and moisture by the wall of the capsule completely surrounding the interior. The capsule wall may also be designed to protect the substance from light. Unlike the glass or plastic ampoules known from the prior art, the capsule does not have to be opened and emptied by the user but, for preparing a solution, can be introduced as a whole into the liquid, where it dissolves at least partially, preferably completely, so that the substance escapes into the liquid and dissolves therein. The loss of a portion of the substance contained in the capsule is thus completely ruled out, whereas substance can be lost during the opening of the ampoule and/or remain in the ampoule in the method described in the prior art. Since the user also cannot accidentally come into contact with the substance enclosed in the capsule, the risk of contamination is also greatly reduced, as are possible safety risks in the case of toxic or harmful substances. The stirring body belonging to the capsule can serve to accelerate the dissolution of the capsule wall and of the substance.

The stirring body can be a solid. If the capsule is placed into a liquid in which its wall dissolves at least partially, the solid can be used, by shaking or otherwise mechanically moving the liquid or a container containing the liquid, to swirl the substance emerging from the capsule in the liquid and thus to accelerate the dissolution of the substance in the liquid.

In an advantageous embodiment, the stirring body can have a magnet, for example a permanent magnet. After addition of the capsule to a liquid accommodated in a container, the magnet can be set in motion by means of a further magnet, for example a rotor magnet of a magnetic stirrer, located outside the container, and thus accelerate the dissolution of the capsule wall and/or of the substance in the liquid by stirring. In this embodiment, it is also possible to stir the solution permanently and thus to keep particulate matter distributed homogeneously in the solution.

The capsule according to the present disclosure permits a highly precise metering of the substance and can therefore be used for the preparation of any solutions for use with measuring devices of analytical engineering and particularly advantageously for the preparation of a standard solution for the calibration, verification and/or adjustment of measuring devices. A standard solution is understood to mean a solution which contains a known or predetermined quantity of an analyte, on the concentration of which the measurand depends. In this application for preparing a standard solution, the substance contains a predetermined quantity of the at least one analyte or a substance which leads to the formation of the analyte by a chemical reaction with a reactant, which is, for example, contained in the liquid. However, the capsule is equally suitable for use in preparing other solutions for the measuring device, for example for preparing a reagent solution for carrying out a chemical reaction of a reagent contained in the reagent solution with the at least one analyte.

The stirring body can be surrounded by the wall of the capsule, connected to the wall or at least partially embedded in the wall. The stirring body may comprise a shell or coating of a chemically inert material, for example plastic, such as PVDF or PTFE. For example, the stirring body can consist of a magnet which has such a coating or sheathing.

The wall of the capsule can be formed from a material which is at least partially soluble in a solvent, such as water. If the solvent is water, the wall of the capsule can be formed from a water-soluble and/or swellable material. For example, cellulose, gelatin, agar-agar or carrageenan may be used. The material is advantageously selected with respect to the use for which the capsule is intended such that it does not influence the determination of the measurand by means of the measuring device. This has the advantage that the measurement result obtained with the measuring device is independent of a mass or wall thickness of the capsule so that production fluctuations in the preparation of capsules do not play any role in terms of the shape and wall thickness of the individual capsules.

As mentioned, the substance may comprise a predetermined quantity of the analyte or a substance which can be converted by chemical reaction to the analyte. In this embodiment, the solution to be prepared is a standard solution for verifying, calibrating or adjusting a measuring device.

The substance can be present in the interior of the capsule as a solid or bound to a solid phase. In the latter case, it may be bound to the solid phase by physisorption or chemisorption.

A system for preparing a solution for use with a measuring device for determining a measurand that depends on a concentration of at least one analyte in a sample comprises at least one capsule according to one of the above-described embodiments and a liquid container, which may be closed in a liquid-tight manner and which contains a predetermined volume of a liquid containing a solvent. The wall of the capsule is formed from a material that at least partially dissolves in the solvent.

As already described, the wall of the capsule can protect the substance in the interior from contamination, oxygen, moisture and possibly also from light. The liquid container, for example a bottle, can also be designed to keep the predetermined volume of the liquid comprising the solvent closed or sealed in order to protect this component from contamination, oxygen, light and moisture.

In an embodiment in which the stirring body has a magnet, the system can also comprise a magnetic stirrer which is configured to generate a magnetic field which serves to drive the stirring body. For this purpose, the magnetic stirrer can have a rotor magnet and a drive coupled to the rotor magnet for moving the rotor magnet. Alternatively, the magnetic stirrer may be configured to generate a rotating field without mechanically moved parts.

In order to prepare the solution, the capsule can be placed into the liquid contained in the liquid container, the wall of the capsule being at least partially dissolved in the solvent and the substance arriving from the interior of the capsule into the liquid and dissolving therein. This process can be accelerated by means of the magnetic stirrer by bringing the liquid container so close to the rotor magnet of the magnetic stirrer that the magnet of the capsule is set in motion by magnetic coupling with the rotor magnet and thus serves as a stirrer for the solution to be prepared.

If the solvent contained in the liquid is water, the wall of the capsule can be formed from a water-soluble and/or swellable material, such as the already mentioned cellulose, gelatin, agar-agar, or carrageenan.

If the solution that can be prepared with the system is a standard solution for calibrating, verifying and/or adjusting the measuring device, the substance contained in the capsule can form a first component of the standard solution. The liquid may form a second component of the standard solution. The substance forming the first component may comprise a single chemical substance, for example the analyte. However, it is also possible for the substance contained in the capsule to be a mixture of a plurality of chemical species, for example of various ions or molecules. The substance may also contain a carrier material to which a chemical substance, for example the analyte, to be dissolved in the liquid is bound. Similarly, the second component may comprise one or more different chemical species. The components are advantageously divided in such a way that the substances present in one of the respective components do not undergo any chemical (decomposition) reactions or undergo chemical (decomposition) reactions which take place only very slowly with one another.

The substance contained in the capsule may comprise a predetermined quantity of a first reactant which, upon mixing and/or dissolving the substance in the liquid, undergoes a chemical reaction which involves at least one second reactant contained in the liquid and in which the analyte forms as a reaction product.

In addition to the analyte or the first reactant, the substance may comprise an extender which is inert to the further constituents of the solution to be prepared and also does not influence the determination of measured values by the measuring device. Advantageously, the extender is soluble in the liquid, but this is not absolutely necessary. Suitable extenders are, for example, sugar, starch or a silicate. By means of the extender, the analyte or reactant is present in diluted form in the capsule, for example in a ratio of 1:50 or 1:100 or 1:500 of analyte to total content of the capsule. As a result, the filling accuracy of the analyte or reactant in the capsule can be improved. For example, this is advantageous for the preparation of standard solutions with particularly low concentrations of the analyte.

The second reactant may be present in the solution from the outset. However, it is also possible for the system to additionally comprise at least one second capsule which has a wall completely surrounding an interior and at least one second substance accommodated within the interior, wherein the wall of the second capsule is designed to dissolve at least partially in the solvent, and wherein the second substance comprises the second reactant. The second capsule may also comprise a magnet. In this case, in order to prepare the solution, both capsules are added simultaneously or successively to the liquid so that both reactants dissolve in the liquid. The chemical reaction by which the analyte is formed then takes place during or after dissolution of the first and the second reactant in the liquid. The substance contained in the second capsule may also comprise an inert extender in addition to the second reactant.

If the system is configured to prepare a reagent solution to be added to a sample, the substance contained in the first capsule may comprise a substance which is intended for carrying out a chemical reaction with the analyte.

The at least one capsule of the system or all of the capsules belonging to the system can be enclosed in an outer packaging in a gas-tight and liquid-tight manner. The at least one first capsule of the system or all of the capsules belonging to the system can be accommodated in a blister packaging which has a flexible rear wall, on which the at least one first capsule rests, and a plastic film molding which is connected to the flexible rear wall in such a way that the plastic film molding and the rear wall form a closed chamber in which the at least one first capsule is arranged.

The liquid may be contained in a closed liquid container. The closed liquid container can be used for storage and/or transport for the predetermined volume of the liquid before the solution is prepared. The closure can be secured and/or sealed, for example in such a way that it is apparent if the bottle has already been opened. The closure can be configured to be reclosable. After the first opening, the liquid container can be reclosable so that it can serve for storing and transporting the prepared solution after the liquid has been prepared by adding the capsule to the liquid in the liquid container.

The packaged components, which are to be combined to prepare the solution, can be marked on the packaging by the manufacturer. This allows traceability of the prepared solutions. Safety instructions, application recommendations, use-by dates, or other information regarding the components and their use may also be printed on the packaging. Since the user does not make any further changes to the composition of the individual components but only brings them together, quality fluctuations can be identified on the basis of the identifiers on the packagings and traced back to the manufacturer of the components. Alternatively or additionally, the individual capsules may also be marked.

The liquid may advantageously contain a stabilizer for inhibiting chemical or photochemical degradation reactions in the prepared solution.

The method according to the present disclosure for preparing a solution for use with a measuring device for determining a measurand that depends on a concentration of at least one analyte in a sample includes a step of adding at least one capsule to a volume of a liquid comprising a solvent already present in a liquid container. The capsule has a wall completely surrounding an interior and at least one substance accommodated within the interior and at least one stirring body, such as a stirring body including a magnet. The wall of the capsule at least partially dissolves in the liquid and the substance accommodated in the interior escapes into the liquid. The method also includes a step of mixing the substance with the liquid and/or dissolving the substance in the liquid.

The method permits a highly precise metering of the substance and can be used equally well for the preparation of a standard solution for the calibration, verification or adjustment of measuring devices and for the preparation of reagent solutions for carrying out a chemical reaction of a reagent contained in the reagent solution with the analyte for qualitative or quantitative determination.

In a possible embodiment, the predetermined volume of the liquid comprising the solvent is provided already measured in a closed, possibly also sealed, liquid container. In this case, the method comprises opening the liquid container prior to adding the capsule. In this embodiment of the method, an error of the user when measuring the components for the liquid to be prepared is practically ruled out. During dissolution of the substance in the liquid or after dissolution of the substance, the liquid container can be closed again. In this case, the reclosed liquid container can serve for storing and transporting the prepared solution.

In an embodiment in which the stirring body comprises a magnet, the method may further comprise the following step: bringing the liquid container close to or in contact with a magnetic stirrer which is configured to generate a magnetic field which serves to drive the stirring body, in such a way that the magnetic field causes the magnet (3) of the capsule (1) to move after the capsule (1) has been added to the liquid (7). The magnet contained in the capsule thus serves as a contactlessly driven stirrer for accelerating the dissolution of the capsule wall and/or of the substance contained in the capsule in the liquid.

A further advantage of using the capsule with the integrated stirring body, which may be in the form of a magnet, in the method according to the present disclosure can come into play if the substance has a relatively low density or is contained in the capsule only in a small quantity. Without the stirring body, the capsule would float on the liquid surface in such cases. The capsule is weighted down by the stirring body and can thus sink to the bottom in the liquid container. If the stirring body has a magnet, the magnet is attracted by the magnetic field generated by the magnetic stirrer and can thus be drawn under the liquid surface.

The solution prepared with the described method is a standard solution for calibrating, verifying and/or adjusting the measuring device, wherein the substance forms a first component of the standard solution, and wherein the liquid forms a second component of the standard solution.

To this end, the substance may comprise a predetermined quantity of the analyte or of a first reactant which, upon mixing and/or dissolving the substance in the liquid, undergoes a chemical reaction which involves at least one second reactant contained in the liquid and in which the analyte forms as a reaction product.

Alternatively, the solution may be a reagent solution containing a substance intended for carrying out a chemical reaction with the analyte. The reagent solution can be used in a qualitative or quantitative detection method of an analyte.

The wall of the capsule can advantageously be formed from a material which does not influence the determination of the measurand by means of the measuring device.

In this case, the substance can form a first component of the reagent solution comprising one or a plurality of chemical substances, wherein the liquid forms a second component of the reagent solution comprising one or a plurality of chemical substances.

As already stated with reference to the system described above, the components for preparing the reagent or the standard solution can be divided in such a way that the substances present in one of the respective components undergo no chemical (decomposition) reactions or chemical (decomposition) reactions which take place only very slowly with one another.

The liquid may contain at least one stabilizer for inhibiting chemical or photochemical degradation reactions of the analyte or of the substance intended for carrying out a chemical reaction with the analyte in the prepared solution.

The present disclosure also relates to a method for calibrating, verifying or adjusting a measuring device for determining a measurand that depends on a concentration of at least one analyte in a sample. The method includes a step of preparing at least one standard solution by means of the above-described method or using the capsule described herein or the system described herein. The method also includes steps of detecting, using the measuring device, at least one measured value of the measurand in at least a portion of the standard solution, and calibrating, verifying or adjusting the measuring device using the at least one measured value.

The volume of the liquid predetermined in the step of preparing the standard solution may be presented in a closable or closed liquid container. In this case, the capsule can be added directly to the volume of the liquid provided in the liquid container, possibly after the opening of the liquid container, and the substance escaping from the capsule can be mixed with the liquid and/or dissolved in the liquid in the liquid container. The liquid container can be closed again after opening and adding the capsule. This is advantageous if the measuring device is an automatic analyzer because the liquid container can serve both as a transport and storage container for the standard solution and can also be used directly as a standard solution reservoir in the analyzer. This saves intermediate steps for transferring the liquid or the prepared standard solution and avoids loss of liquid.

Accordingly, the method may comprise the further steps of correcting the liquid container to a liquid line fluidly connected to a reaction vessel of the analyzer, metering at least one predetermined volume of the standard solution contained in the liquid container into the reaction vessel via a liquid line, performing a chemical reaction of the analyte contained in the solution with at least one reactant supplied to the reaction vessel in order to form a reaction product, and detecting a measured value dependent on the quantity of the reaction product formed.

For calibration, verification or adjustment, the method further comprises comparing the measured value with a reference measured value representing the concentration of the analyte in the standard solution that is assumed to be correct. This reference measured value can be determined from the volume of the liquid used for preparing the standard solution and the quantity of the analyte contained in the capsule.

Capsules such as the capsule described above or the system described above can also be used in a standard addition method for determining a concentration of an analyte in a sample-liquid-dependent measurand by means of a measuring device. In this case, a defined quantity of the analyte in the form of a capsule is added to a sample liquid with unknown analyte concentration and a measured value of the analyte concentration is detected after the defined quantity of the analyte has been added. A plurality of capsules with the analyte can be added successively to the sample liquid and a plurality of measured values can be acquired and extrapolated in a manner known per se to determine the unknown analyte concentration present in the sample liquid before addition of the capsules.

BRIEF DESCRIPTION OF THE DRAWINGS

The present disclosure is explained in further detail below on the basis of the exemplary embodiments shown in the figures. They show.

DETAILED DESCRIPTION

Figure 1:
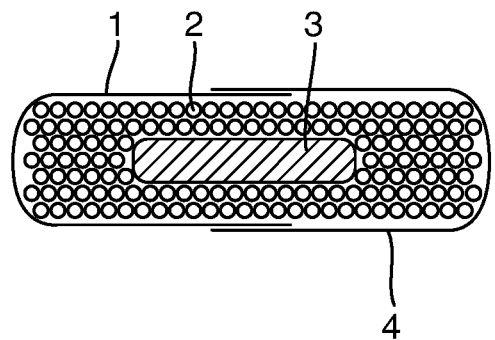
FIG. 1 shows a schematic representation of a capsule for preparing a solution for use with a measuring device.

FIG. 1 schematically illustrates an exemplary embodiment for a capsule 1 for preparing a solution for use with a measuring device for determining a measurand that depends on the concentration of an analyte in a sample. Such a measuring device is also referred to below as an analytical measuring device.

The capsule 1 consists of a wall 4 which completely surrounds an interior and which, in the exemplary embodiment shown here, is composed of two halves. The interior contains a substance 2, which is in the form of a solid powder in the present example. Furthermore, a rod-shaped magnet 3 is arranged in the interior. In the present example, the magnet 3 is embedded in the substance 2 in the interior of the capsule 1. In alternative embodiments, it is however also possible for the magnet to be arranged on the inner or outer side of the wall 4 and to be fixedly connected thereto, for example glued or partially embedded. The magnet 3 can also be completely embedded in the wall of the capsule. The magnet 3 can be a rod-shaped or rotation-ellipsoidal permanent magnet. It may comprise a chemically inert shell or coating, for example made of a plastic, such as PVDF or PTFE. Such permanent magnets are known, for example, as so-called "magnetic stirring bars" or "stirring bars" in the chemical laboratory.

The substance 2 is intended to be at least partially dissolved in a liquid comprising a solvent, for example water, in order to prepare the solution. If the solution to be prepared is, for example, a standard solution for the adjustment, verification or calibration of the analytical measuring device with a predetermined or known analyte concentration, the capsule 1 can comprise a predetermined and known quantity of the analyte or a substance convertible into the analyte by chemical reaction. In addition, the substance 2 can contain further substances, for example stabilizers or fillers.

Figure 2:
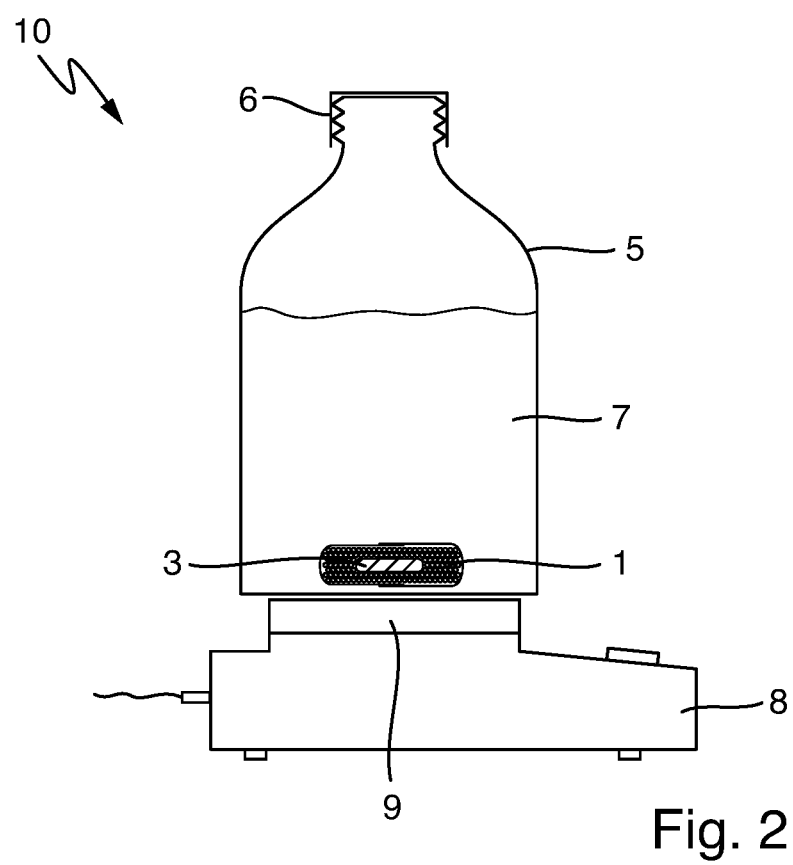
FIG. 2 shows a schematic representation of a system for preparing a solution for use with a measuring device.

FIG. 2 schematically illustrates an exemplary embodiment of a system 10 for preparing a solution for use with an analytical measuring device. In the exemplary embodiment described here, the solution is a standard solution for the calibration, verification and/or adjustment of an analysis measuring device. In the example shown here, the system 10 comprises a closable liquid container 5 with a removable screw cap 6 in which a liquid 7 is contained, and a capsule 1. The substance 2 and the liquid 7 contained in the liquid container 5 form two components of the standard solution to be prepared. Both components can be stored separately from one another in the system 10.

In the exemplary embodiment shown in FIG. 2, the system 10 comprises a magnetic stirrer 8 in addition to the liquid container 5 and the capsule 1. The magnetic stirrer 8 is a conventional magnetic stirrer known from the chemical laboratory. It has a horizontal, optionally heatable, plate 9 on which the liquid container 5 can be placed. Furthermore, the magnetic stirrer 8 has a rotor magnet (not visible in FIG. 2) arranged rotatably in the plane of the plate 9 or in a plane extending in parallel to this plane, and a drive which drives the rotational movement of the rotor magnet. When the capsule 1 is placed into the liquid 7 in the liquid container 5, the magnet 3 of the capsule 1 follows the movement of the rotor magnet and thus serves as a contactlessly driven stirrer for the solution to be prepared in the container. The preparation of the solution can be accelerated by stirring. The magnetic stirrer 8 is an advantageous but not mandatory component of the system 10.

In the present example, the substance 2 in the capsule 1 contains a predetermined quantity of the analyte, the concentration of which can be determined by means of the analytical measuring device after combination with the liquid 7. If the analytical measuring device is, for example, an analyzer, for example for determining the phosphate content of a sample, the capsule 1 may contain a phosphate salt. Optionally, the substance 2 may contain further constituents, for example an adsorbent which is indifferent to the analysis, for example diatomaceous earth, or stabilizers, buffers or an extender. The liquid 7 contains a solvent in which the substance 2, for example the analyte, in this case the phosphate salt, is soluble. This solvent can be water, for example. In addition, the liquid 7 may contain further constituents, for example stabilizers or buffers. The volume of the liquid contained in the liquid container 5 is exactly defined. It can be matched to the quantity of analyte contained in the capsule 1 in such a way that a specific, known or calculable analyte concentration is produced by dissolving the substance 2 in the liquid 7. The wall 4 of the capsule 1 is formed of a material which is at least partially soluble in the solvent, in this case water, and which does not influence the determination of the analyte by the analytical measuring device. Gelatin, for example, is suitable.

In order to prepare the standard solution, the screw cap 6 is removed from the liquid container 5, and the capsule 1 is placed into the liquid container 5. The liquid container 5 can then be closed again. The wall of the capsule 1 dissolves in the liquid 7 so that the substance 2 escapes into the liquid 7 and dissolves therein. In order to accelerate the dissolution of the capsule 1 and the substance 2 and to homogenize the mixture of substance 2 and the liquid 7, the magnet 3 can be agitated by means of the magnetic stirrer 8 in order to stir the liquid 7. In addition, the liquid 7 can be heated.

The preparation of the standard solution by means of the system 1 is thus very simple. The capsule 1 with the predetermined quantity of the analyte contained in the substance 2 and the liquid container 5 with the already measured volume of the liquid 7 can be made available to a user. In this case, the user does not need to measure the substance quantities used for the preparation of the standard solution. Since the capsule 1 as a whole is placed into the liquid 7 already present in the liquid container 5, there is no risk of errors occurring during the mixing of the components due to the loss of residues of the substances used remaining in a packaging or ampoule. In that the magnet 3 for stirring the liquid 7 is already integrated in the capsule 1 during the preparation of the standard solution, the preparation of the standard solution is particularly convenient for the user. In addition, the entrainment of undesired substances into the solution to be prepared by introducing an insufficiently cleaned stirrer into the liquid container 5 is ruled out.

In a variation of the method, it is also possible for two or more capsules 1 containing the same substance 2 to be dissolved in the liquid 7 already provided in the liquid container 5 in order to obtain a standard solution of higher concentration. On the other hand, the prepared standard solution can also be further diluted in a subsequent step by adding a specific volume of the solvent.

Figure 3:
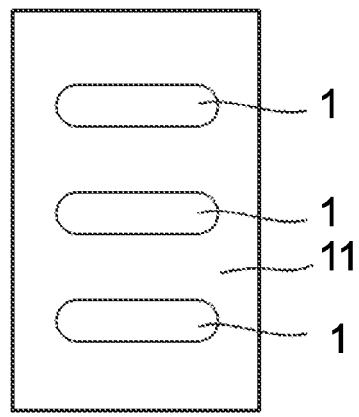
FIG. 3 shows a schematic representation of a blister packaging with a plurality of capsules.

An advantageous packaging of the capsule 1 is shown in FIG. 3. Shown schematically in this case is a blister packaging 11 in which a plurality of identical capsules 1 are packed together. The capsules 1 in the example described here contain the same substance 2, each containing the same predetermined quantity of the analyte. In another embodiment, it is also possible for the capsules contained in the blister packaging to contain different quantities of the analyte. It is also possible to mark the packaging or the capsules individually in order to, for example, assign an individual serial number and an individual substance quantity to each capsule. The label may also be machine-readable (e.g. a barcode). Traceability may thereby be optimized. The blister packaging 11 has a flexible rear wall on which the capsules 1 rest. The rear wall can consist, for example, of cardboard or a metal foil. The capsules 1 are fixed by a plastic film molding which is connected in an edge region to the flexible rear wall so that the plastic film molding and the rear wall form in each case a chamber closed in a gas-tight manner for each of the capsules 1. The capsules 1 are thus protected from oxygen and moisture, for example.

A plurality of variations of the exemplary embodiment described here is conceivable: The system 10 described here and the associated method can also be used, for example, for preparing solutions other than standard solutions, such as for preparing reagent solutions for an analyzer. In the example described here, only a single capsule is used. However, it is also possible that the solution to be prepared is prepared from more than two different components. For example, two or more capsules with different substances can be dissolved in a predetermined quantity of a liquid. A corresponding system suitable for this method comprises a single blister packaging 11 in which all the capsules to be used are combined. The liquid container 5 with the liquid 7 does not necessarily have to be provided as a package with the capsules 1. In a variation of the exemplary embodiment, it is also possible for the user to measure the liquid 7 during the preparation of the standard solution and to present it in a container before adding the capsule 1.

Figure 4:
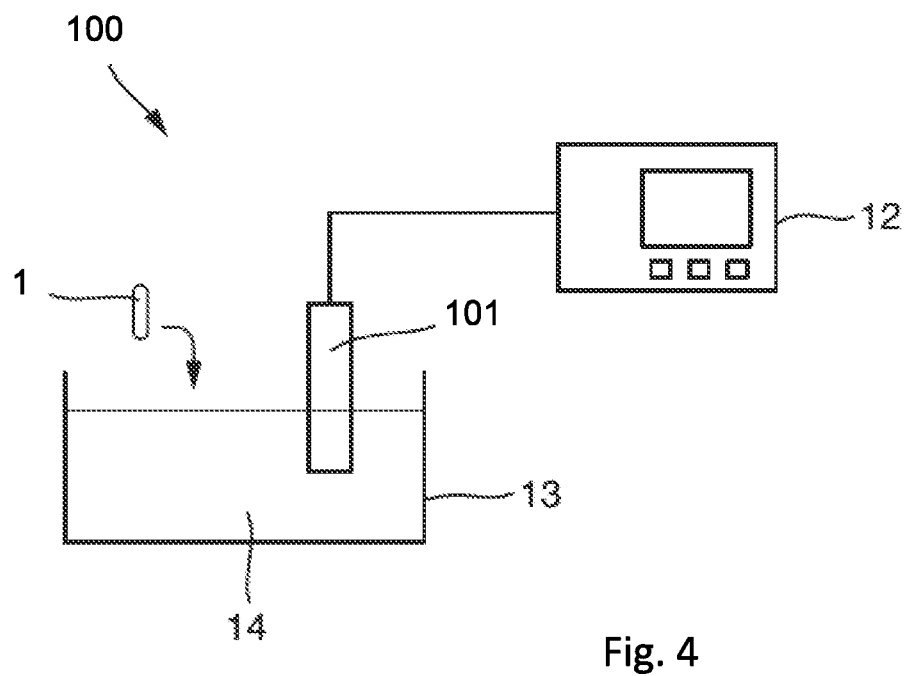
FIG. 4 shows a schematic representation of a measurement setup for a standard addition method for determining a concentration of an analyte in a sample of unknown composition.
Figure 5:
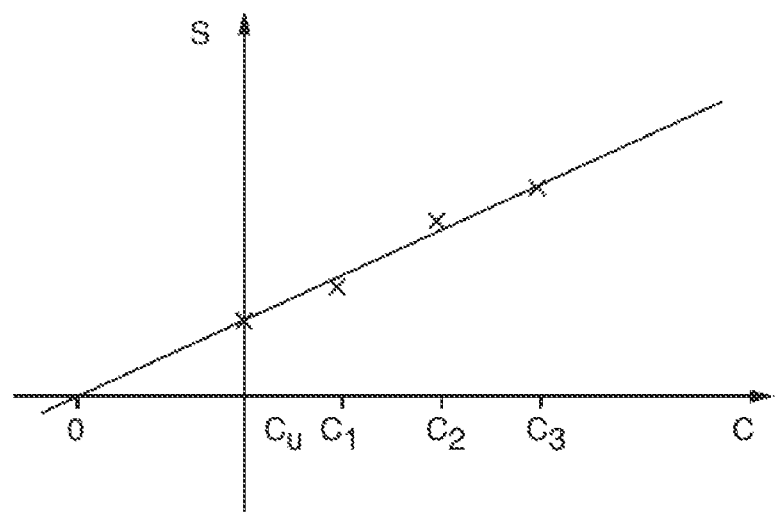
FIG. 5 shows a graphical representation of concentration measured values detected with the measurement setup shown in FIG. 4.

FIG. 4 schematically shows a measurement setup for determining a measurand that depends on the concentration of an analyte in a sample according to the standard addition method. The measurement setup comprises a measuring device 100 with a probe 101 and a measurement transducer 12 connected to the probe 101. A container 13 contains a liquid sample 14 of unknown composition. The probe 101 dips into the sample 14 in order to detect measured values. In the present exemplary embodiment, the probe 101 is an ion-selective electrode for measuring ammonium. It produces a measuring voltage that depends on the ammonium concentration in the sample 14 and outputs it to the measurement transducer 12 for further processing. In order to carry out a standard addition method, a plurality of capsules 1 can now be added successively to the sample 14, each containing a substance having a predetermined quantity of the analyte, in this case an ammonium salt. At least one of the added capsules may comprise a magnet. The container 13 can be mounted onto a magnetic stirrer, such as the magnetic stirrer 8 described with reference to FIG. 2. By means of the magnetic stirrer 8, the magnet arranged in the capsule 1 can be stirred in order to stir the sample 14 during the dissolution of the capsule 1 and the substance contained therein. After each capsule 1 is added and dissolved, a new measurement signal is detected. This measurement signal sequence is shown in FIG. 5. In the diagram, the concentration c of the sample is plotted on the abscissa and the measurement signal S (here: measuring voltage) supplied by the measuring device 100 is plotted on the ordinate. The measurement signal plotted at cu was detected in the sample without addition. The measurement signal plotted at concentration c1 was detected after addition to the sample and dissolution of a first capsule 1, the measurement signal plotted at concentration c2 was detected after addition to the sample and dissolution of a further, identical capsule 1, and the measurement signal plotted at concentration c3 was detected after addition to the sample and dissolution of a third identical capsule. By linear regression, a best-fit straight line can be determined based on the measuring points detected for the concentrations c1, c2, c3, and the zero point and the value of cu based thereon can be determined by extrapolation of the straight line.

The method described here with reference to FIG. 4 is suitable for measurements according to the standard addition method with measuring devices which do not consume the sample during the measurement. These are, for example, electrochemical sensors, such as potentiometric or amperometric sensors, e.g. ion-selective electrodes or pH sensors, conductivity sensors or photometric or spectrometric measuring probes.

On the other hand, measurements with analyzers are carried out while consuming the sample. In this case, the sample liquid to be examined is divided into a plurality of individual samples, and a measurement signal corresponding to the measurement signal at the unknown concentration cu is detected with a first sample. In each case, different quantities of the analyte are added to further samples by respectively adding a different number of identical capsules 1 to the individual parts of the sample. The analyzer can then detect further measurement signals with the further samples. The obtained measurement signals are then plotted completely analogously to the diagram shown in FIG. 5, and a best-fit straight line is determined and extrapolated. The value of the unknown concentration cu can be determined by the extrapolation.

Figure 6:
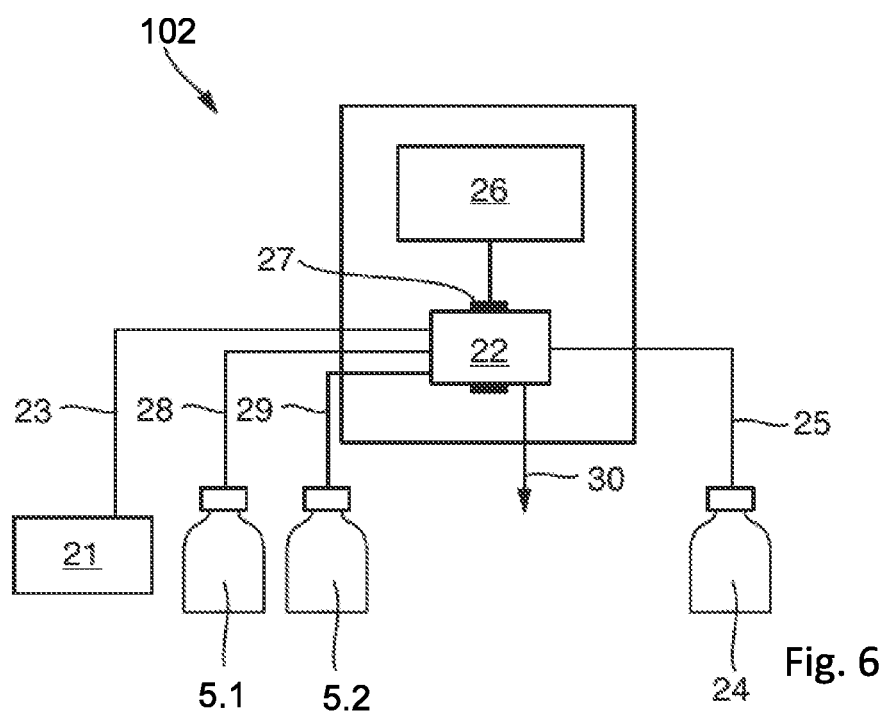
FIG. 6 shows a schematic representation of the setup of an analyzer for determining the concentration of an analyte.

FIG. 6 shows an analyzer 102 which uses two standard solutions for calibration and/or adjustment prepared according to the method described in connection with FIGS. 1 and 2. The analyzer 102 is connected to a sample receiver 21 which contains a sample liquid and from which said analyzer removes a sample in each case in order to detect a measured value of a measurand that depends on the concentration of an analyte. The analyzer has a measuring cell 22 which is connected to the sample receiver 21 via a fluid line 23. The analyzer 102 further comprises a first liquid container 24 which contains a reagent solution. The liquid container 24 is connected to the measuring cell 22 via a further liquid line 25. Lastly, the analyzer 102 has two further liquid containers 5.1 and 5.2, each containing a standard solution. The liquid container 5.1 contains the analyte in a first known concentration, and the liquid container 5.2 contains the analyte in a second known concentration different therefrom. Both liquid containers 5.1, 5.2 are fluidly connected to the measuring cell 22.

The standard solutions contained in the liquid containers 5.1, 5.2 were prepared by adding one or more capsules 1 to a fixedly predetermined volume of a liquid 7 already presented in the liquid containers 5.1, 5.2 and by at least partially dissolving in the liquid 7 the capsule wall and the substance contained therein and containing the analyte. The same liquid volume was presented in both liquid containers 5.1, 5.2 in the present example. In order to produce a higher concentration in the liquid container 5.2, a larger number of capsules 1 was added to the liquid volume than to that in the liquid container 5.1. After the standard solutions have been prepared, the liquid containers 5.1 and 5.2, which were originally used as storage containers for the liquid 7, now serve as reservoirs of the analyzer and are connected to its measuring cell 22 via fluid lines 28, 29. The magnets 3 originally contained in the capsules 1 and any remaining residues of the walls 4 of the capsules 1 can remain in the liquid containers 5.1, 5.2 during use in the analyzer 102, since the walls 4 of the capsules are formed from a material not influencing the analysis, e.g. gelatin, and the magnet 3 likewise does not impair the measurement.

In addition to the fluid lines 23, 28, 29, 25, the analyzer 102 comprises valves and/or pumps (not shown in FIG. 4) for transporting the sample, the standard solutions and the reagent solution. The analyzer 100 has an electronic control and measuring system 26 for controlling the valves and pumps and for detecting and processing measured values. The measuring cell 22 has a sensor 27 which is designed to carry out a photometric measurement in a liquid contained in the measuring cell 22, and to output detected measurement signals to the electronic control and measuring system 26.

In order to detect a measured value, the electronic control and measuring system 26 transports a sample from the sample receiver 21 into the measuring cell 22 and adds a predetermined quantity of the reagent solution contained in the liquid container 24 to the sample via the fluid line 25. A chemical reaction takes place in the liquid mixture thus formed, which results in a reaction product. By means of the sensor 27, the electronic control and measuring system 26 detects a measurement signal of the sensor 27 that depends on the concentration of the reaction product, and determines a measured value of the measurand based on the measurement signal. After the measured value has been determined, the spent liquid is discharged again from the measuring cell 22 via a discharge line 30.

The measured value of the measurand is determined from the measurement signal by means of a calibration function which assigns measured values to values of the measurement signal. The calibration function can be checked (calibrated or verified) or adapted (adjusted) from time to time by means of the standard solutions. For this purpose, the electronic control and measuring system 26 can transport standard solution from the liquid container 5.1 or the liquid container 5.2 into the measuring cell 22, instead of a sample from the sample receiver 21, and detect a measured value of the measurand in a completely analogous manner as described above for the sample. A calibration, verification or adjustment can be carried out on the basis of a comparison of the reference value of the measurand that is known for the standard solutions and assumed to be correct with the measured value determined by the electronic control and measuring system. Since the standard solutions in the liquid containers 5.1 and 5.2 are prepared according to the simple and hardly error-prone method described above, the calibration, verification and adjustment of the analyzer with these standard solutions is also hardly error-prone and allows reliable measurement operation with little maintenance effort.

The invention claimed is:

1. A capsule for preparing a solution for use with a measuring device for determining a measurand that depends on a concentration of at least one analyte in a sample, including:
    a wall completely enclosing an interior;
    at least one substance accommodated within the interior; and
    at least one stirring body positioned within in the interior;
    wherein the substance is present in the interior of the capsule as a solid or bound to a solid phase.

2. The capsule of claim 1, wherein the stirring body has a magnet.

3. The capsule of claim 1, wherein the stirring body is surrounded by the wall or connected to the wall or at least partially embedded in the wall.

4. The capsule of claim 1, wherein the wall is formed from a material which is at least partially soluble in a solvent.

5. The capsule of claim 1, wherein the substance comprises a predetermined quantity of the analyte or of a substance which can be converted by chemical reaction to the analyte.

6. The capsule of claim 1, wherein the substance comprises a predetermined quantity of a first reactant which is selected such that it undergoes with at least one second reactant a chemical reaction in which the analyte forms as a reaction product.

7. A system for preparing a solution for use with a measuring device for determining a measurand that depends on a concentration of at least one analyte in a sample, including:
    at least one capsule including:
        a wall completely enclosing an interior;
        at least one substance accommodated within the interior; and
        at least one stirring body positioned within the interior; and
    a liquid container which contains a predetermined volume of a liquid containing a solvent;
    wherein the wall of the capsule is formed from a material which dissolves at least partially in the solvent
    wherein the substance is present in the interior of the capsule as a solid or bound to a solid phase.

8. The system of claim 7, wherein the stirring body includes a magnet, and wherein the system further comprises a magnetic stirrer configured to generate a magnetic field serving to drive the stirring body.

9. The system of claim 7, wherein the solution is a standard solution for calibrating, verifying or adjusting the measuring device.

10. The system of claim 9, wherein the substance forms a first component of the standard solution, and wherein the liquid forms a second component of the standard solution.

11. The system of claim 9, wherein the substance comprises a predetermined quantity of the analyte or of a first reactant which, upon mixing and/or dissolving the substance in the liquid, undergoes a chemical reaction which involves at least one second reactant contained in the liquid and in which the analyte forms as a reaction product.

12. The system of claim 7, wherein the at least one first capsule is enclosed in an outer packaging in a gas-tight and liquid-tight manner.

13. The system of claim 7, wherein the at least one capsule is accommodated in a blister packaging which has a flexible rear wall on which the at least one capsule rests and a plastic film molding which is connected to the flexible rear wall in such a way that the plastic film molding and the rear wall form a closed chamber in which the at least one capsule is arranged.

14. A method for preparing a solution for use with a measuring device for determining a measurand that depends on a concentration of at least one analyte in a sample, including:
    adding at least one capsule to a volume of a liquid comprising a solvent already present in a liquid container, wherein the capsule has a wall completely surrounding an interior and at least one substance accommodated within the interior, and at least one stirring body positioned within the interior;
    wherein the wall of the capsule at least partially dissolves in the liquid and the substance accommodated in the interior escapes into the liquid; and
    mixing the substance with the liquid and/or dissolving the substance in the liquid;
    wherein the substance is present in the interior of the capsule as a solid or bound to a solid phase.

15. The method of claim 14, wherein the liquid container is initially closed and wherein the method comprises the further step of:
    opening the liquid container and adding the capsule to the volume of the liquid already provided in the liquid container, wherein the substance escaping from the capsule is mixed with the liquid or dissolved in the liquid in the liquid container.

16. The method of claim 14, wherein the stirring body includes a magnet, and wherein the method further comprises the step of bringing the liquid container close to or in contact with a magnetic stirrer which is configured to generate a magnetic field which serves to drive the stirring body, in such a way that the magnetic field causes the magnet of the capsule to move after the capsule has been added to the liquid.

17. The method of claim 14, wherein the solution is a standard solution for calibrating, verifying or adjusting the measuring device, and wherein the substance forms a first component of the standard solution, and wherein the liquid forms a second component of the standard solution.

18. The method of claim 14, wherein the wall of the capsule is formed from a material which does not influence the determination of the measurand by means of the measuring device.

19. The method of claim 14, wherein the liquid contains at least one stabilizer for inhibiting chemical or photochemical degradation reactions of the analyte in the prepared solution.

20. The method of claim 14, including:
    detecting by means of the measuring device at least one measured value of the measurand in at least a portion of the standard solution; and
    calibrating, verifying or adjusting the measuring device using the at least one measured value.

* * * * *